United States Patent
Meckl

(10) Patent No.: US 7,559,232 B2
(45) Date of Patent: Jul. 14, 2009

(54) VACUUM TURNTABLE SYSTEM FOR LEAK TESTING MELT BLOWN BOTTLES

(75) Inventor: Michael F. Meckl, Hartford, WI (US)

(73) Assignee: Air Logic Power Systems, LLC, Milwaukee, WI (US)

( * ) Notice: Subject to any disclaimer, the term of this patent is extended or adjusted under 35 U.S.C. 154(b) by 126 days.

(21) Appl. No.: 11/849,561

(22) Filed: Sep. 4, 2007

(65) Prior Publication Data

US 2008/0072658 A1 Mar. 27, 2008

Related U.S. Application Data

(60) Provisional application No. 60/824,317, filed on Sep. 1, 2006.

(51) Int. Cl.
*G01M 3/02* (2006.01)
*B65G 47/00* (2006.01)

(52) U.S. Cl. .................. 73/45.3; 73/40; 198/478.1

(58) Field of Classification Search .............. 73/40, 73/41, 45, 45.3, 52; 198/478.1; 211/78, 211/163; 285/272; 414/222.01, 223.01
See application file for complete search history.

(56) References Cited

U.S. PATENT DOCUMENTS

| | | | | | |
|---|---|---|---|---|---|
| 3,608,909 | A | * | 9/1971 | Rabinow | 369/270.1 |
| 3,795,137 | A | * | 3/1974 | Lo et al. | 73/45.4 |
| 3,803,877 | A | * | 4/1974 | Becker | 65/241 |
| 3,852,995 | A | * | 12/1974 | Duncanson | 73/40 |
| 4,065,135 | A | * | 12/1977 | Doughty | 369/271.1 |
| 4,065,286 | A | * | 12/1977 | Becker | 65/229 |
| 4,441,955 | A | * | 4/1984 | Richardson et al. | 156/423 |
| 4,582,191 | A | * | 4/1986 | Weigand | 198/339.1 |
| 4,675,070 | A | * | 6/1987 | Pasternicki | 156/556 |
| 5,136,157 | A | * | 8/1992 | Apter et al. | 250/223 B |
| 5,591,899 | A | * | 1/1997 | Griesbeck | 73/41 |
| 6,186,760 | B1 | * | 2/2001 | Latham | 425/149 |
| 6,256,095 | B1 | * | 7/2001 | Ringlien | 356/239.4 |
| 6,416,308 | B1 | * | 7/2002 | Pena | 425/169 |
| 6,473,169 | B1 | * | 10/2002 | Dawley et al. | 356/239.4 |
| 6,719,551 | B2 | * | 4/2004 | Polk, Jr. | 425/126.1 |
| 6,781,689 | B2 | * | 8/2004 | Chiba | 356/240.1 |
| 6,854,608 | B2 | * | 2/2005 | McNeeley et al. | 211/78 |
| 7,040,167 | B2 | * | 5/2006 | Hayward et al. | 73/592 |
| 7,455,514 | B2 | * | 11/2008 | Netsu | 425/534 |
| 2006/0177575 | A1 | * | 8/2006 | Takemoto et al. | 427/248.1 |
| 2008/0012304 | A1 | * | 1/2008 | Fujiwara | 285/272 |

* cited by examiner

*Primary Examiner*—David A. Rogers
(74) *Attorney, Agent, or Firm*—Nicholas A. Kees; Godfrey & Kahn, S.C.

(57) ABSTRACT

A machine for leak testing melt blown bottles includes a base plate and is provided with a vacuum. The machine includes a turntable assembly, which has an inner ring fastened to the base plate. The inner ring includes a channel about its circumference connected to the vacuum. An outer ring is formed of multiple parts, and fitted slidingly but sealingly around the inner ring. The outer ring has vacuum ports in communication with the channel of the inner ring. A turntable is rotatably connected to the outer ring and includes openings formed in its upper surface communicating with the vacuum ports. The outer ring may be held together by one or more O-rings. Vacuum fittings transfer the vacuum between the openings in the turntable and the vacuum ports of the outer ring.

8 Claims, 7 Drawing Sheets

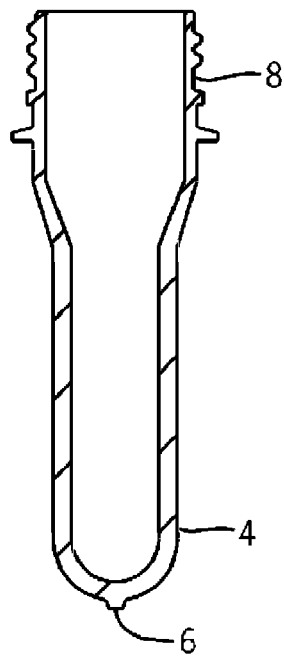
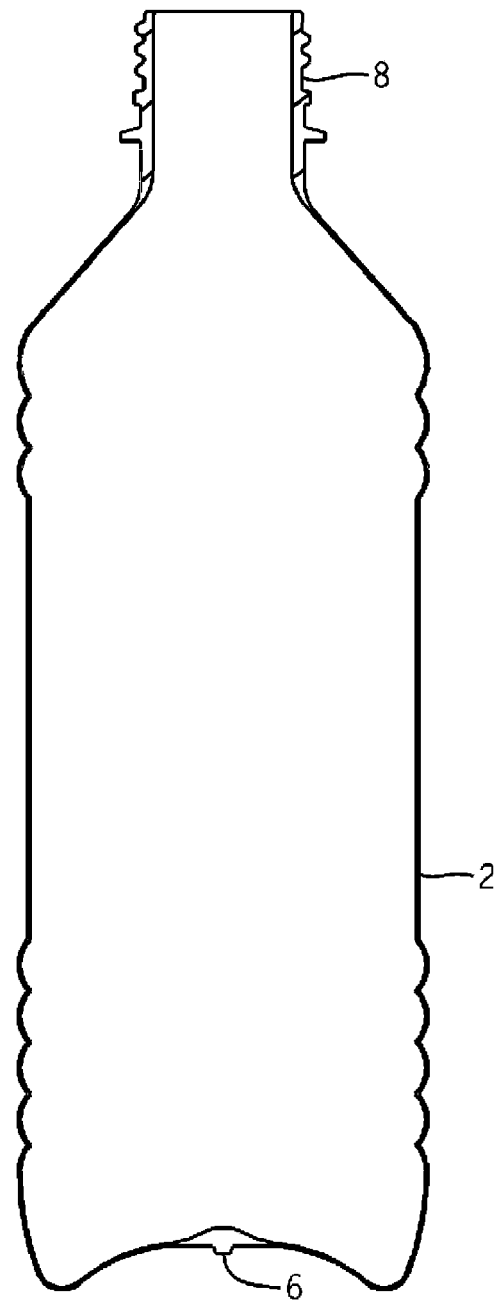
FIG. 1
PRIOR ART
FIG. 2
PRIOR ART

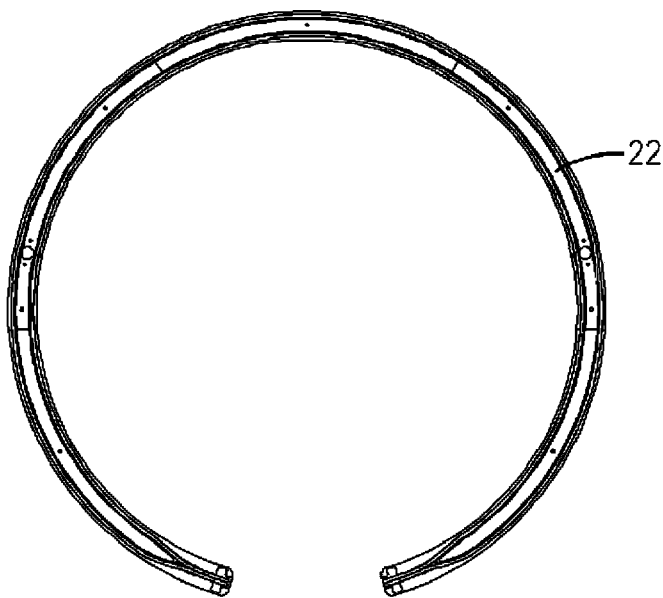
FIG. 4
PRIOR ART
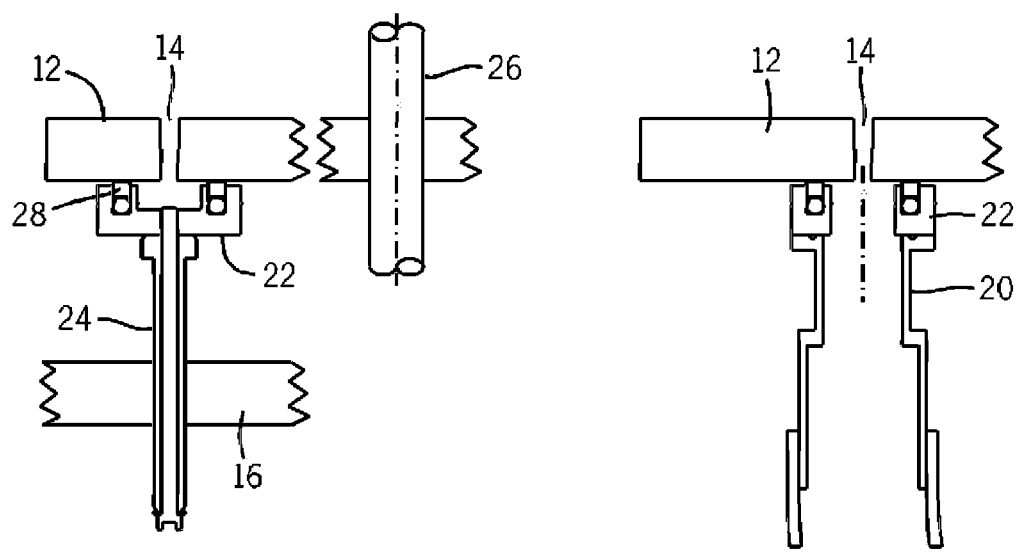
FIG. 5
PRIOR ART
FIG. 6
PRIOR ART

VACUUM TURNTABLE SYSTEM FOR LEAK TESTING MELT BLOWN BOTTLES

CROSS REFERENCE TO RELATED APPLICATION

This application claims the benefit under 35 U.S.C. § 119 (e) of a provisional patent application filed on Sep. 1, 2006, Application Ser. No. 60/824,317.

BACKGROUND OF THE INVENTION

This invention relates to leak testing of melt blown bottles, and particularly to improvements to the vacuum turntable for testing for leaks in the bottom surface of the bottles.

Referring now to FIGS. 1 and 2, many types of bottles 2, such as for sport drinks, bottled water, and many other substances, are formed in a melt blown process where a molded pre-form 4, formed originally of polyethylene terephthalate (PET) or similar materials is heated to within a predetermined range of the melting temperature of the material, and expanded by air pressure inside a mold to the final shape of the bottle. One particular point of the mold, the gate 6, is formed in the process of molding the pre-form 4 at the end of the pre-form opposite the neck 8. The gate 6 forms at the point where molten plastic is injected into the mold (not shown) during the manufacture of the pre-form 4. The area around the gate 6 is susceptible to cracks, splits or other defects that can result in open passages or leaks after the bottle 2 is formed. Because of the subtlety of the leak problems associated with the gate 6, it is particularly important to test this portion of the finished container 2 for leaks.

Conventionally, as shown at FIGS. 3-6, a turntable assembly 10 is provided with a flat turntable 12 which is rotated by a prime mover (not shown). The turntable 12 is provided with perforations 14 about its periphery. Bottles or containers to be tested for leaks are placed over these perforations 14. The vacuum for testing the bottles is provided from underneath the turntable 12 in the following manner. A stationary base plate 16 is connected to a source of vacuum by hoses 18 and fittings 20. To the base plate 16 is mounted a stationary vacuum plenum 22 by means of a number of jack screws 24. When assembled, the turntable 12 rotates, by means of an axle 26 or other suitable rotational means, resting just above the vacuum plenum 22. Sealing strips 28 are mounted to the vacuum plenum 22, to provide a certain level of seal in terms of passing the vacuum force through the openings 14 and to the bottom surface of the bottle 2.

This structure has several limitations and disadvantages, mainly relating to the fact that there must be a gap maintained between the sealing strip 28 and the bottom surface of the turntable 12, in order for the turntable to actually turn. At the same time, this gap between the sealing strips 28 and the turntable 12 must be small enough so as to ensure that sufficient vacuum is maintained through the openings 14 so as to conduct an effective test of the bottom of the bottle being tested. In the conventional apparatus, the ideal gap is between 0.008 inches and 0.010 inches. Any irregularity in the bottom surface of the turntable 12, or the overall flatness of the turntable 12, adversely affects this critical gap. If the gap becomes too large, vacuum is not maintained. If the gap becomes too small or closes entirely, the friction between the sealing strips 28 and the turntable 12 becomes so great that excessive power is necessary to be applied to rotate the turntable. This limitation is exacerbated as the diameter of the turntable is enlarged. That is, given the miniscule size of the ideal gap described above, as the diameter of the turntable is enlarged, it becomes more and more difficult to maintain this ideal gap, particularly as the diameter of the turntable is enlarged from two feet through four feet toward five feet. Larger diameters of turntables are desirable to support faster operation of bottle production lines while still maintaining the bottles in the turntable long enough to test for leakage.

Further, the fact that the gap is required to exist at all results in substantial leakage and loss of vacuum. Even the ideal gap described above allows a considerable amount of vacuum leakage thus reducing the effective vacuum at the base of the bottle 2. This leakage increases as diameter of the turntable 12 is increased, even when the ideal gap is maintained. When that leakage is coupled with the added leakage as the gap increases due to turntable runout, the vacuum source must be sized considerably larger to maintain an effective level of vacuum at the base of the bottle 2.

It will be noted that the vacuum plenum and sealing strips do not form a complete circle, but rather only the majority of a circle, there being a substantial gap at one portion of the circumference. This gap in the vacuum plenum and sealing strips exists because it is important that one portion of the turntable not have vacuum applied to the openings at that portion, so that the bottles may be easily removed from the turntable at some point in the sequence.

This invention relates to improvements to the apparatus described above, or to solutions to problems raised or not solved thereby.

SUMMARY OF THE INVENTION

The invention provides a machine for leak testing melt blown bottles. The machine has a base plate and is provided with a source of vacuum. The machine includes a turntable assembly, which has an inner ring fastened to the base plate. The inner ring is formed with a channel facing outwardly about its circumference, and connected to the source of vacuum by vacuum fittings. An outer ring is formed of multiple parts, and fitted slidingly but sealingly around the inner ring. The outer ring has vacuum ports in communication with the channel of the inner ring. A turntable is connected to the outer ring for rotation therewith. The turntable has openings formed in its upper surface, those openings communicating with the vacuum ports of the outer ring. The several parts of outer ring are held together by means of one or more O-rings sized and stretched so as to surround the outer ring and hold the several parts thereof together. Vacuum fittings transfer the vacuum to between the openings in the turntable and the vacuum ports of the outer ring.

Other objects and advantages of the invention will become apparent hereinafter.

BRIEF DESCRIPTION OF THE DRAWING FIGURES

FIG. 1 is a sectional view of a conventional pre-form.

FIG. 2 is a sectional view of a conventional blow-molded bottle formed from a pre-form similar to that shown in FIG. 1.

FIG. 4 is a top plan view of a sealing ring used in the conventional turntable assembly shown in FIG. 3.

FIG. 5 is a cross sectional view of the turntable assembly shown in FIG. 3, through the jack screw area.

FIG. 6 is a cross sectional view of the turntable assembly shown in FIG. 3, through the vacuum fitting area.

DESCRIPTIONS OF THE PREFERRED EMBODIMENTS

Figure 3:
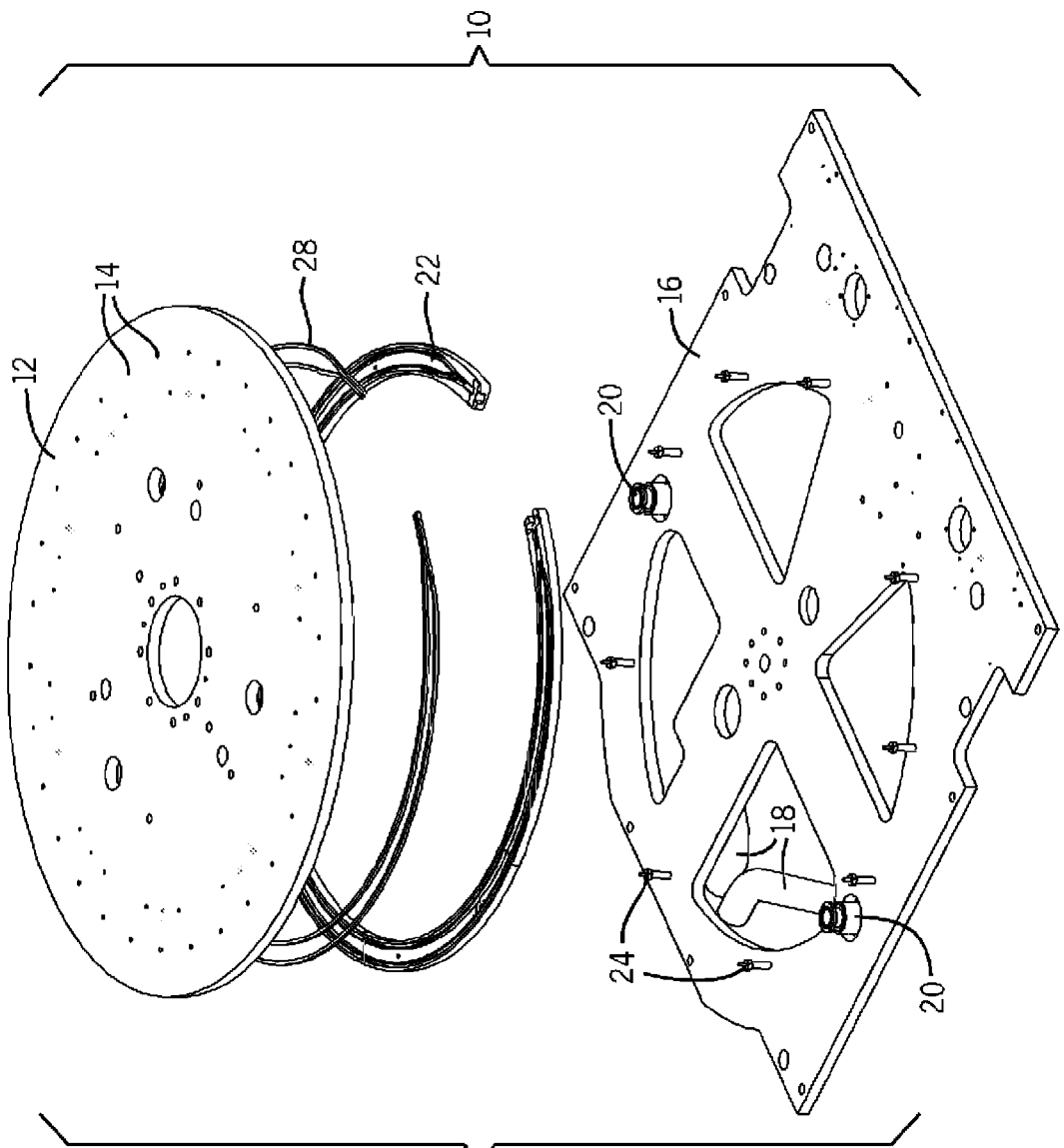
FIG. 3 is an exploded perspective view of a conventional turntable assembly.
Figure 7:
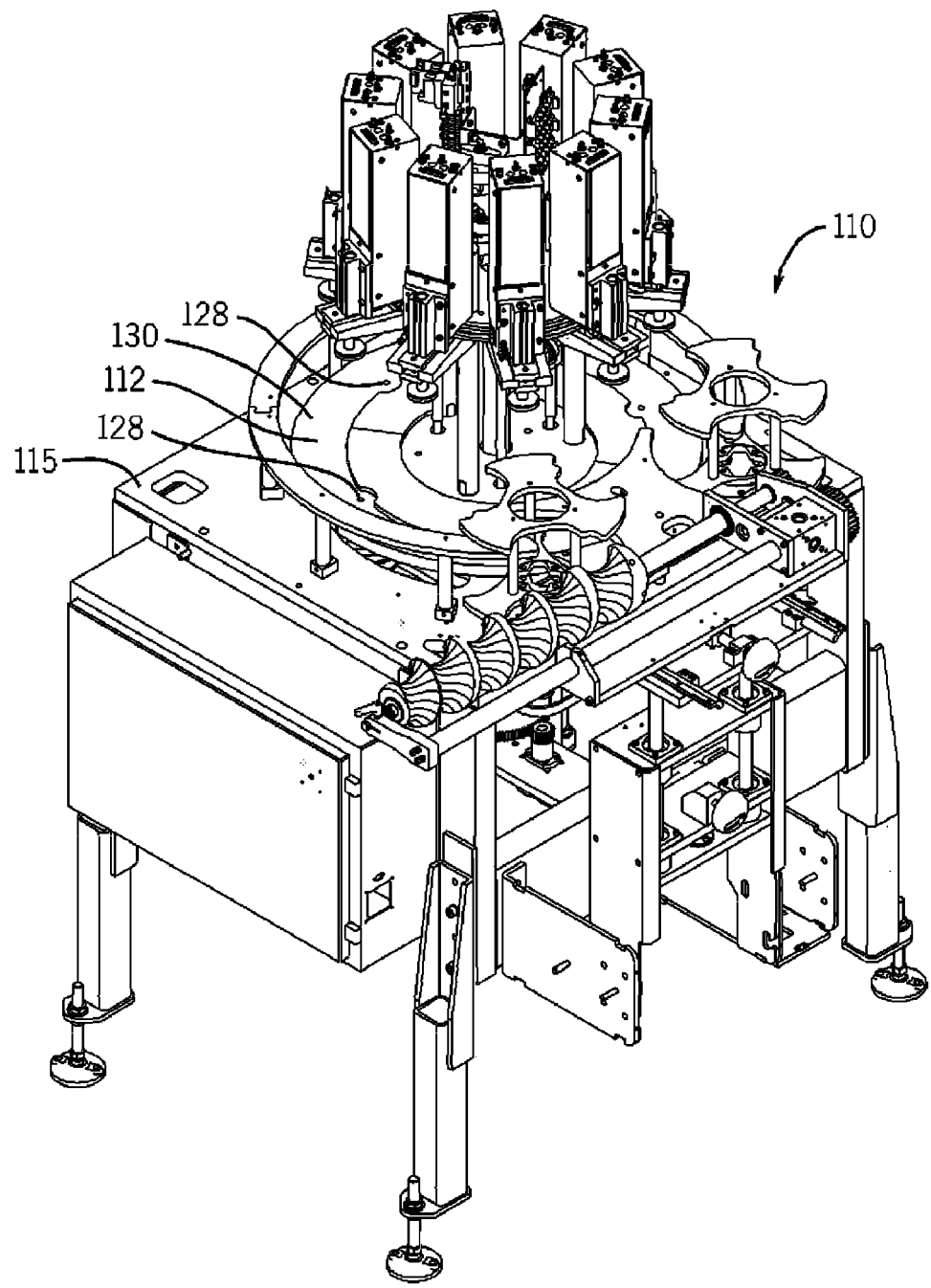
FIG. 7 is a perspective view of a machine having a turntable assembly constructed according to a preferred embodiment of the invention.

Referring now to FIG. 7, there is shown a machine 110 for leak testing melt blown bottles. The machine 110 includes a turntable assembly 112 constructed according to a preferred embodiment of the invention. Shown in more detail in FIGS. 8-10, the turntable assembly 112 includes a stationary inner ring 114 fastened to the base plate 115 of the machine by any suitable removable means, such as jack screws 116. Vacuum is supplied to the inner ring 114 by any suitable means, such as conventional vacuum fittings 117. An outer ring 118 is formed of multiple parts (in the embodiment shown, two parts, 118a and 118b) and fitted slidingly but sealingly around stationary inner ring 114. That is, outer ring 118 may rotate, while inner ring 114 remains stationary. The several parts of outer ring 118 are held together in the most preferred embodiment by means of one or more O-rings 120 sized and stretched so as to surround outer ring 118 and hold the several parts thereof together.

Figure 10:
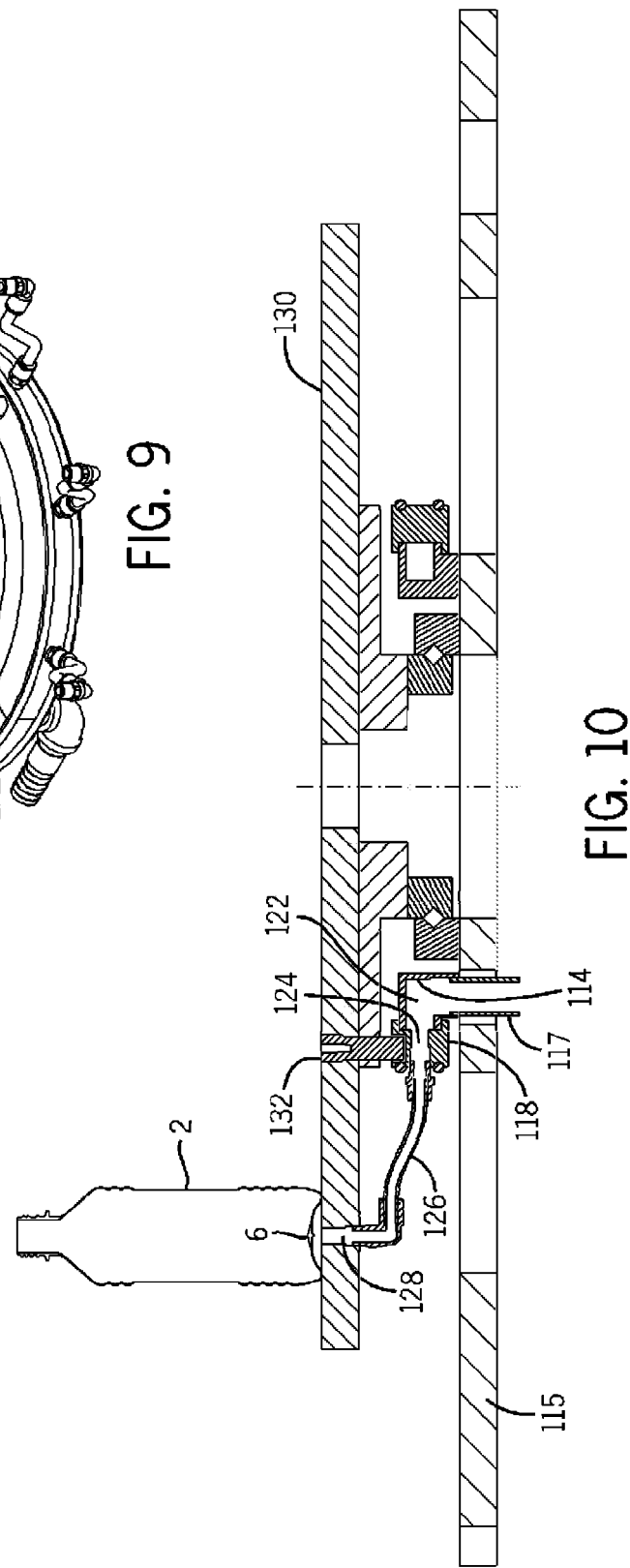
FIG. 10 is a cross sectional view of the turntable assembly shown in FIG. 8.
Figure 11:
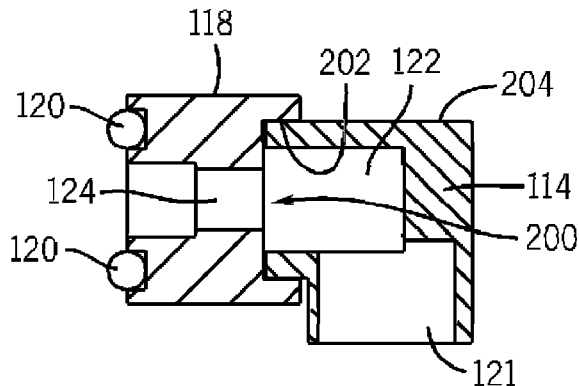
FIG. 11 is a cross sectional view of a portion of the turntable assembly shown in FIG. 8.

As shown in sectional view in FIGS. 10 and 11, inner ring 114 is formed with a channel 122 facing outwardly and, when assembled to outer ring 118, communicating with a plurality of openings 124 formed in the outer ring. Inner ring 114 is connected to vacuum fitting 117 via one or more openings 121 in the inner ring, provided for that purpose. Connected to vacuum ports 124 in outer ring 118 are further vacuum fittings 126, which transfer the vacuum to openings 128 provided for that purpose in turntable 130. From a physical connection standpoint, turntable 130 is connected to inner ring 118 by means of drive pins 132. In the embodiment shown in FIG. 10, drive pins 132 are secured to turntable 130, and engaged with outer ring 118 so that the ring rotates generally along with the turntable.

It will be seen that this structure avoids entirely the problems of the conventional apparatus referred to above, both maintaining the gap, and the use of large amounts of power to rotate the turntable. There is no such gap to be maintained, and so the turntable may be enlarged as necessary to efficiently conduct the testing. And enlarging the diameter of the turntable, or increasing the vacuum force for that matter, does not increase the friction associated with the rotation of the turntable, and so less power to used to accomplish the rotation, so much so that smaller motors may be specified and used to accomplish the same functionality.

This new design further addresses the limitations described above by virtue of the inwardly directed channel 200 of the outer ring 118. In the most preferred embodiment channel 200 surrounds an outer circumference of inner ring 114 and allows very little clearance for vacuum leakage. In addition to providing sealing surfaces above and below inner ring 114, In addition, since there is a negligible amount of runout in the assembly, the total amount of vacuum loss stays consistent. And since the plenum size remains constant regardless of turntable diameter, the amount of leakage allowed remains constant. The overall decrease in vacuum leakage allows for a "smaller" vacuum source while still maintaining an effective vacuum level at the base of the bottle 2. In addition to providing sealing surfaces above and below inner ring 114, an upper inner surface 202 of channel 200 may cooperate with an upper surface 204 of inner ring 114 to provide a bearing surface to support turntable 130 if runout of any of the various components of assembly 112 might cause vertical wobbles during rotation (see FIG. 11).

Figure 8:
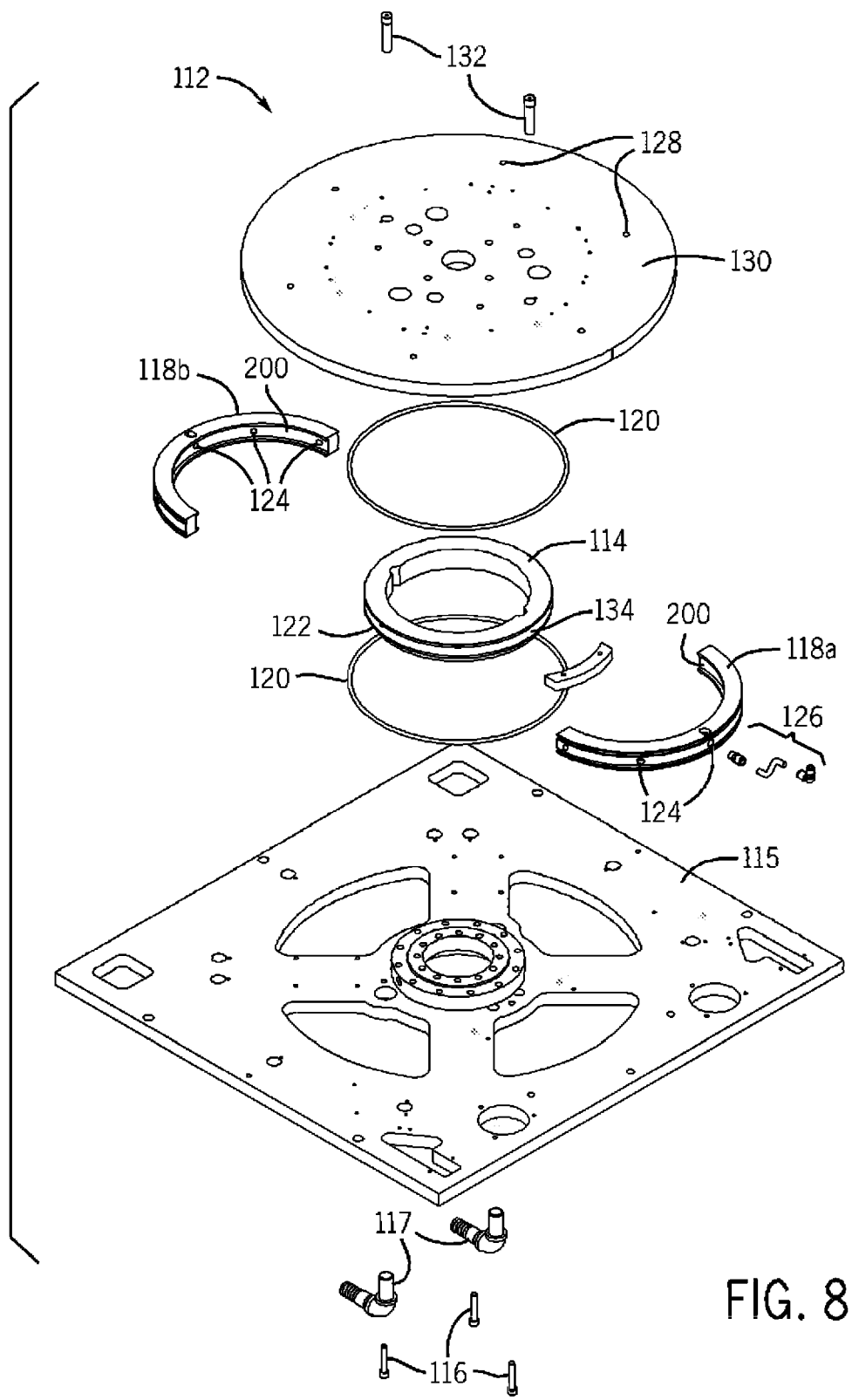
FIG. 8 is an exploded perspective view of a turntable assembly constructed according to a preferred embodiment of the invention.
Figure 9:
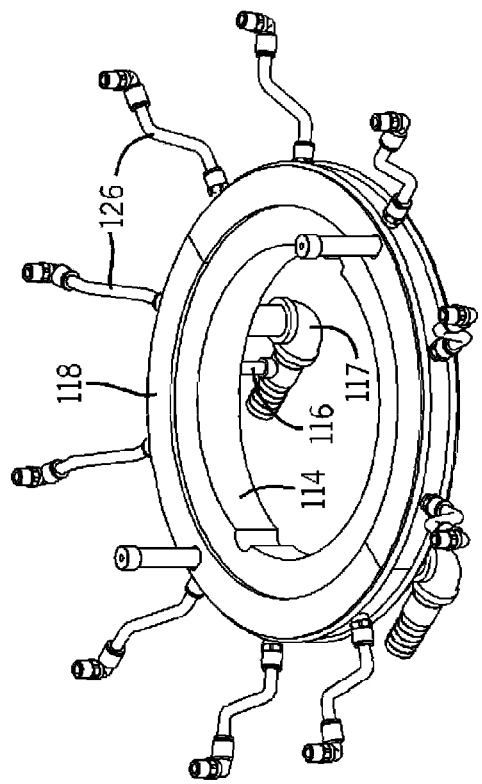
FIG. 9 is a perspective assembly view of a portion of the turntable assembly shown in FIG. 8.

As indicated above, in order to easily move the bottles to be tested onto and off of the turntable 130, a portion of the turntable must be free of vacuum. To accomplish that function within this structure, a portion of the circumference of the channel 122 of stationary inner ring 114 is closed. In the embodiment shown in FIG. 8, the closure may be accomplished by machining. With reference to FIG. 8, channel 122 may be machined into stationary inner ring 114 about a circumference of the ring, except in a certain area 134, which constitutes a portion of the circumference of the inner ring where the vacuum is desirably closed off or blocked.

Figure 12:
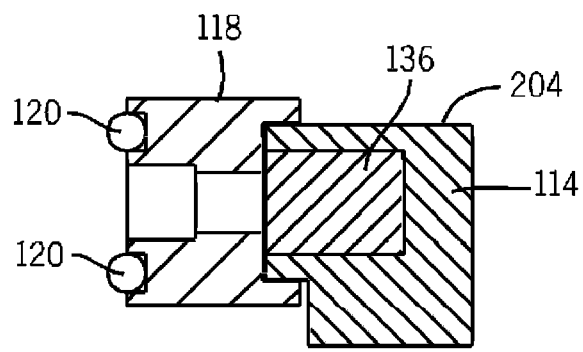
FIG. 12 is a cross sectional view of a portion of the turntable assembly shown in FIG. 8, taken in an area where the vacuum channel of the inner ring is blocked.
Figure 13:
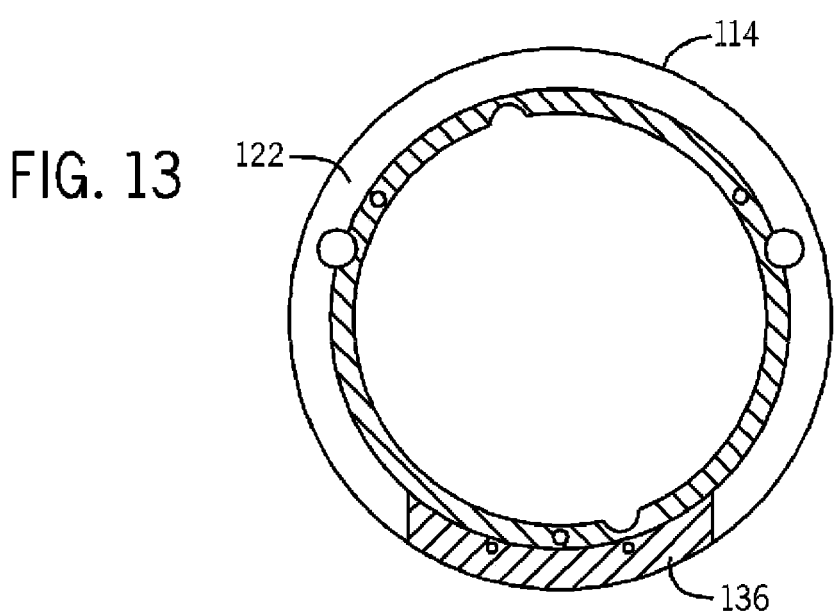
FIG. 13 is a cross sectional view of the inner ring formed according to one embodiment of the invention.

An alternative embodiment is shown in vertical section in FIG. 12 and horizontal section FIG. 13. In this embodiment, channel 122 may be generally uniformly machined all the way around inner ring 114, but may be filled by a block or other insert 136 for a portion of the circumference essentially equivalent to the portion 134 as shown above.

While the apparatus hereinbefore described is effectively adapted to fulfill the aforesaid objects, it is to be understood that the invention is not intended to be limited to the specific preferred embodiments of leak testing machine and turntable assembly set forth above. Rather, it is to be taken as including all reasonable equivalents to the subject matter of the following claims.

The invention claimed is:

1. A machine for leak testing melt blown bottles, comprising:
 a machine base plate;
 a source of vacuum; and
 a turntable assembly, including:
 a non-rotating inner ring fastened to the base plate, formed with a channel facing outwardly about a portion of a circumference of the inner ring, and connected to the source of vacuum by vacuum fittings;
 an outer ring formed of multiple parts, fitted slidingly but sealingly around the inner ring, and having vacuum ports communicating with the channel of the inner ring; and
 a turntable connected to the outer ring for rotation therewith, having openings formed therein and communicating with the vacuum ports of the outer ring.

2. The machine of claim 1, wherein the several parts of outer ring are held together by one or more O-rings sized and stretched so as to surround the outer ring and hold the several parts thereof together.

3. The machine of claim 1, further comprising vacuum fittings which transfer the vacuum between the openings in the turntable and the vacuum ports of the outer ring.

4. The machine of claim 1, further comprising an inward facing channel formed in the outer ring, the circumference of the inner ring received within the channel of the outer ring.

5. A turntable assembly for use in a machine for leak testing melt blown bottles, the turntable assembly comprising:
- a non-rotating inner ring fastened to a base plate in the machine, the inner ring formed with a channel facing outwardly about a portion of a circumference of the inner ring, and connected to a source of vacuum by vacuum fittings;
- an outer ring formed of multiple parts, fitted slidingly but sealingly around the inner ring, and having vacuum ports communicating with the channel of the inner ring; and
- a turntable connected to the outer ring for rotation therewith, having openings formed therein and communicating with the vacuum ports of the outer ring.

6. The turntable assembly of claim 5, wherein the several parts of outer ring are held together by one or more O-rings sized and stretched so as to surround the outer ring and hold the several parts thereof together.

7. The turntable assembly of claim 5, further comprising vacuum fittings which transfer the vacuum to between the openings in the turntable and the vacuum ports of the outer ring.

8. The turntable assembly of claim 5, further comprising an inward facing channel formed in the outer ring, the circumference of the inner ring received within the channel of the outer ring.

* * * * *